United States Patent [19]
Fleming

[11] Patent Number: 5,192,163
[45] Date of Patent: Mar. 9, 1993

[54] CORRECTION METHOD FOR CONTAMINATED SITES

[76] Inventor: Joseph W. Fleming, 8381 Post Rd., Allison Park, Pa. 15101

[21] Appl. No.: 890,718

[22] Filed: May 29, 1992

[51] Int. Cl.$^5$ .......................... B09B 1/00; C02F 11/02
[52] U.S. Cl. .................................... 405/128; 405/263; 405/258; 210/602; 210/631; 210/719; 210/747; 210/912
[58] Field of Search ............. 405/128, 129, 258, 263; 210/719, 720, 602, 610, 631, 747, 757, 912

[56] References Cited

U.S. PATENT DOCUMENTS

| | | | |
|---|---|---|---|
| 4,670,244 | 6/1987 | Roos et al. | 210/757 X |
| 4,731,187 | 3/1988 | Moriya et al. | 210/719 |
| 4,948,297 | 8/1990 | Fleming | 405/258 X |
| 5,000,859 | 3/1991 | Suciu et al. | 210/720 X |
| 5,007,771 | 4/1991 | Fu et al. | 405/258 |
| 5,011,604 | 4/1991 | Wilde et al. | 210/602 |
| 5,019,273 | 5/1991 | Fehsenfeld | 210/719 |
| 5,120,160 | 6/1992 | Schwengel | 405/128 |

FOREIGN PATENT DOCUMENTS

2294490  12/1987  Japan .................................. 210/757

Primary Examiner—Randolph A. Reese
Assistant Examiner—Arlen L. Olsen
Attorney, Agent, or Firm—Clifford A. Poff

[57] ABSTRACT

The method essentially creates a lake, if one does not already exist, and uses this lake as a "moving" treating pond for soils contaminated with toxic radicals or compounds containing higher valence state metals. Reducing agent compositions such as saccharides, disaccharides, polysaccharides, $FeS_4$, $Na_2SO_3$, $NaSO_2$, $Na_2S$, and $Na_2S_2O_5$ are introduced into the lake. Contaminated soil from one side of the lake is dragged into the lake, the water of which contains the reducing agent compositions, then is tilled at the bottom of the lake to fully expose the soil to the reducing agent composition, and then is raked upwardly along an opposite side of the lake to form a shoreline of cleaned soil material. Contaminant-consuming micro-organisms and plant life may also be introduced into the lake. The earthmoving process is repeated until lake has passed through and treated all of the contaminated soil site. The method performs all decontamination on-site and avoids the requirement for any backfilling of the site after decontamination of the site. The method is particularly useful in contaminated areas having high water tables.

42 Claims, 4 Drawing Sheets

CORRECTION METHOD FOR CONTAMINATED SITES

BACKGROUND OF THE INVENTION

1. Field of the Invention

The present invention relates to a method for decontamination of contaminated soils and associated groundwaters, in general, and, in particular, to a method for treating soils contaminated toxic with radicals or compounds containing one or more higher valence state metals.

2. Description of the Prior Art

In the past, there have been proposed a variety of methods for decontaminating contaminated soil sites including, inter alia, industrial chemical by-product dumping sites and mining sites. The contaminating substances disposed at such sites include petrochemicals, coal tar chemicals, penta chloro phenol, arsenic compounds, sulfonated organic compounds and a host of others. The methods that have been suggested and/or practiced can be classified under a number of categories including: treatment without moving the soil on site nor removing the soil from the site, thermal treatment with soil removal from the site, and biological treatment with on-site soil movement.

In the category of treatment without moving the soil on-site nor removing the soil from the site there has been proposed the following methods.

First, it has been proposed to electrically heat a block of soil until melted to a glassy state. While such a method may in fact decontaminate the soil, it undesirably and permanently changes the physical characteristics of the soil.

Second, it is known to enclose a decontaminated area with a cement slurry wall and a clay cap. This method does nothing to reduce or eliminate the contamination but merely serves to contain the contamination. Such a method is prone to high ongoing maintenance costs due to periodic and required testing of the region surrounding the contaminated area to determine if contaminants had escaped from the area and the costs of restoring the slurry wall and/or clay cap if leakage had occurred.

Third, it is known to place interceptor water wells around the perimeter of a contaminated area, then pump the contaminated water out from the contaminated area until the water within the area attains a low elevation, and then biologically treat the contaminated water pumped from the wells. Within this method, there are a series of further treatment options which are available.

A first option is to discard the biologically treated water. With this option, groundwater inflow from outside the perimeter area will keep the contamination "bottled-up" within the boundaries of the contaminated area and will, with time, dilute the concentration of contaminants within the contaminated area to an acceptable level. However, no time prediction can be projected for when the site will be virtually free from contamination.

A second option is to re-inject the biologically treated water into the contaminated site in order to move the soil contamination toward the perimeter wells. With this option, clean-up could be erratic and unpredictable due to possible pockets of extremely impervious soil which would lead to uneven groundwater flows.

A third option is to inject biological sludge and oxygen into wells in the contaminated area in the hope of inducing biological activity underground. With this option, unfortunately, the induction of biological activity is not always successful.

A fourth option is to inject solvents, oxygen, steam and other reactive chemicals into the contaminated area and possibly generate reduced pressure in order to decontaminate by chemical reaction. A disadvantage of this option is that it is very inexact and unpredictable.

In the category of thermal treatment with soil removal from the site there has been proposed the use of rotary kilns and externally fired heat treaters.

A rotary kiln has the drawback of mixing heating gases (combustion gases) with gases from the contaminated soil incineration process. This may require the scrubbing of a large volume of gases, and the composition of these gases may widely vary depending upon the contaminant loading in the soil being treated. In addition to the above, a rotary kiln can generate large dust loads in the exhaust gases due to the previously mentioned large volume of gas which occurs when the combustion gases mix with the incineration gases of the treated soil.

An externally fired heat treater is an alternative to the directly-fired rotary kiln. With an externally fired heat treater heat is supplied through the treatment vessel's walls and combustion gases do not come into contact with the soil being treated. However, some combustion gases of low oxygen content could be injected into the treater in order to remove high boiling organic, create a safe low $O_2$ atmosphere, and carbonize any residual organic that do not volatize.

For the soil treatment methods that require the soil be removed, the soil would need to be transported to a treater, treated, and then finally transported to a site that may or may not be the final deposition location for the clean soil. The reason for the uncertainty of the final deposition location is that the water table can be high enough in some locations to cause a virtual mud field to exist so that keeping contamination away from clean soil would be difficult. Also, if the soil to be treated is removed from below the water table, then the water table needs to be lowered by pumping (with appropriate treatment and discard of the pumped water), otherwise the removed soil would be completely saturated with water. If no water was pumped, then the excess water could be drained by placing the treated soil well above the water table for a period of time. In either case, without removal of this excess water, the heat load on the thermal treater would be very high, causing a low through-put rate and high cost of operation of the treater.

If soil removal and treating is pursued, the overall problem reduces to removing contaminated soil, controlling the ground water level in the soil excavation area, treating any soil and water removed from the excavation area and then replacing the clean treated soil in such a manner that the treated soil does not become contaminated. In the performance of such a treatment operation, the method of actually treating the soil can become secondary to the method of soil handling. Furthermore, the cost of auxiliary work (for instance treating and disposing of a large volume of contaminated water) could exceed the cost of operating a soil treater such as a thermal unit.

In the category of biological treatment with on-site soil movement there has been proposed a method of flooding a contaminated dumpsite area to form a pond, using biological micro-organisms to treat the water and soil of the flooded dumpsite, mixing the contaminated soil of the dumpsite pond bottom into the micro-organism infested water, and backfilling the dumpsite upon completion of the biological treatment process. Such a method has proven to be an effective way of treating contaminated soil areas. However, the costs and logistics of supplying a quantity of fill material sufficient to backfill the site (which sometimes can be many acres in area and 20 or more feet in depth) can become quite prohibitive. It is upon this sort of method that the present invention represents a significant and cost-effective improvement.

In order to avoid the costs and logistical problems associated with the above described procedures, a procedure referred to as a "moving lake" biological treatment was suggested in U.S. Pat. No. 4,948,297. In this method, a body of water such as a lake is created on one edge of a contaminated area, if one does not already exist, and then, once biological activity has been established, the lake is caused to be slowly "moved" through the contaminated area. The lake would serve as a large biological treating system and any contaminant in the soil and water, if biologically consumable, would be consumed as the lake progressed through the contaminated area.

While the above described "moving lake" biological treatment can effectively treat contamination, it is known that metallic contamination frequently accompanies such organic contamination. U.S. Pat. No. 4,948,297 discloses that such metallic contamination may be controlled in the lake by passing filtered lake water over a bed a cation exchange resin. Such treatment can, however, be expensive. It is therefore, the object of the present invention to control such metallic contamination without the need to rely on or to fully rely on such cation exchange resins.

SUMMARY OF THE INVENTION

In the method of the present invention a "lake" or other body of water is formed adjacent to soil contaminated with toxic radicals or compounds containing the higher valence state of metals such as $Cr^{+6}$ and $As^{+5}$. A composition for reducing the valence of such metals to a lower valence state is then introduced into the body of water, and that composition is then permitted to decontaminate the adjacent soil contaminated with the radicals or compounds containing such higher valence state metals. The purpose of reducing the valence state of such metals would be to make the radicals or compounds in which they contain less toxic and/or essentially insoluble in water. The decontaminated soil is then moved to another side of the body of water and additional contaminated soil is then decontaminated. This procedure is then repeated until the entire contaminated area has been treated. Other metal containing radical or compound contaminants which could be advantageously reduced in valence state to a less toxic and/or essentially insoluble form would include those containing $Sn^{+4}$, $Hg^{+2}$ and $Cu^{+2}$. Suitable compositions for reducing the valence of such metals are saccharides, disaccharides, polysaccharides, $FeSO_4$, $Na_2SO_3$, $SO_3$, $NaSO_2$, $Na_2S$ and $Na_2S_2O_5$. Preferably the body of water would also contain micro-organisms capable of decontaminating soil contaminated with organic materials. The method of this invention is particularly advantageous in decontaminating areas having high water tables.

DESCRIPTION OF THE PREFERRED EMBODIMENT

Before the method of the present invention can be performed, a complete hydrogeological assay of the contaminated site would be required. Information obtained from the data of the assay would include: A) topographical representation of the water table, B) ground water flow directions and rates, C) extent, concentration and types of contaminants present, D) The expected rate of biological consumption of the various contaminants, and E) the types of soil present throughout the contaminated area.

From the above information, the following plan is developed: A) Determine the initial required lake area and depth, B) Determine the initial lake site and intended movement direction, C) Determine the necessity for slurry walls and/or containment wells, their locations and the required pumping rates of the wells, and D) Determine the hardware necessary for moving and tilling the soil, and for agitating and aerating the lake. Once the aforementioned plan is developed the "moving lake" method is performed in accordance with FIGS. 1–5.

Figure 1:
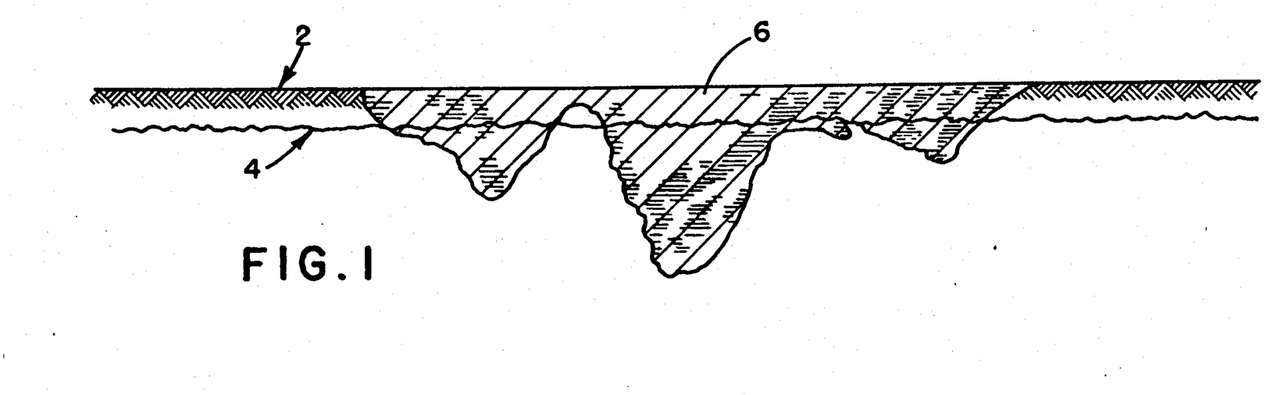
FIG. 1 is cross-section of a contaminated soil site.
Figure 2:
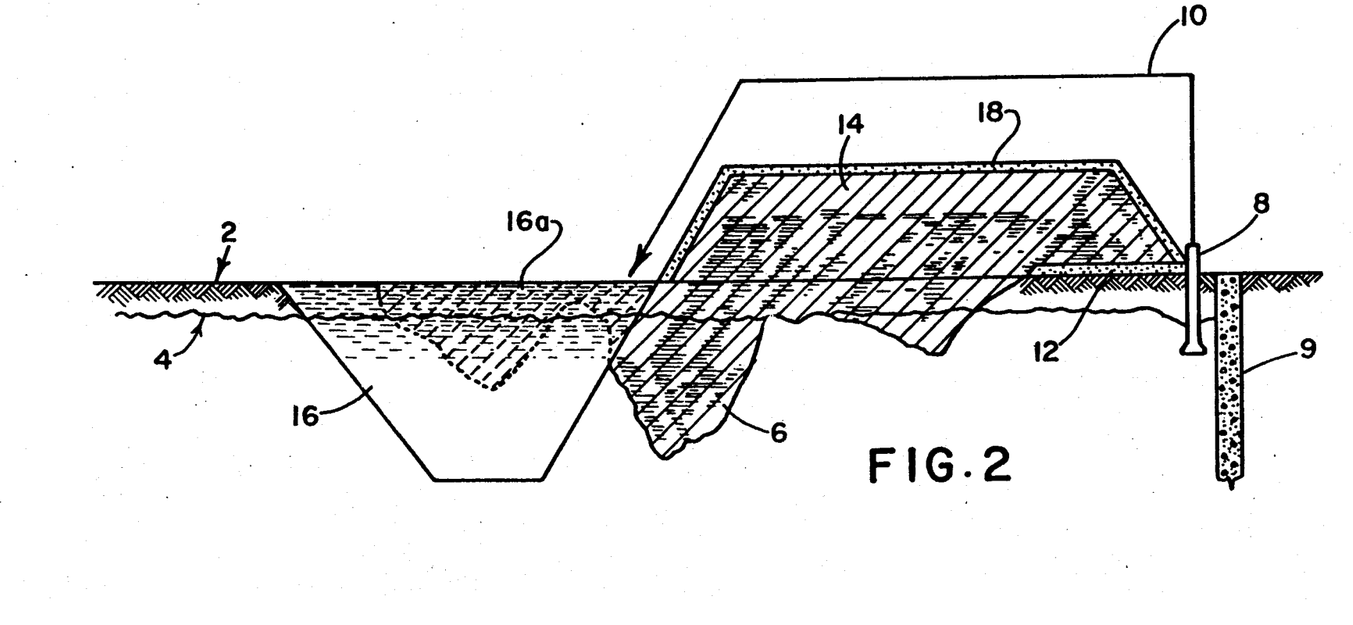
FIGS. 2–5 are sequential illustrations of the creation of a treatment lake and the gradual movement thereof through the contaminated soil site illustrated in FIG. 1.

Depicted in FIG. 1 is a cross-section of the contaminated site as determined from the hydrogeological assay. Shown is the existing soil surface 2, the existing water table 4 and the contaminated soil site 6. If the contamination of contaminated soil 6 is fairly well contained and is not moving vertically or laterally with any significant speed, there may be no necessity for contaminant migration prevention means such as perimeter wells as indicated by well 8 and/or slurry walls as indicated by wall 9 (FIG. 2).

If there is significant lateral or vertical movement of the contamination or if the water table 4 is too low, slurry walls may need to be installed to contain the water inside the walls or perimeter wells 8 may need to be drilled. If the water table is too low, water will need to be pumped from wells 8 through pipeline 10 into the treatment lake which is described in greater detail hereinbelow. For the case of contamination movement, water will be pumped from the wells 8. If the water table 4 is too low, water could be pumped into the wells 8.

Once the contaminant migration at the perimeter has been closed off by a slurry wall or a high water table level is induced by water injection into the perimeter wells 8, additional off-site water can be added to produce a lake with an artificially high water table inside the perimeter slurry wall 9 or perimeter water injection wells 8. To control movement of contaminants due to ground water flow, the injection of clean off-site water into the perimeter wells inside a slurry wall (if present)

would induce any contaminants to migrate towards the lake.

FIG. 2 illustrates clearly the initial stage of operations of the "moving lake" method of the present invention. First, an impervious layer 12 is placed atop soil surface 2 at one side of contaminated soil site 6 and extending the full length thereof. Impervious layer 12 will stop migration of contamination from soils which are placed thereabove and impervious layer 12 should be sloped toward the contaminated soil site 6 so that any water reaching the impervious layer 12 will flow toward the contaminated soil site, e.g. to the left in FIG. 2.

A quantity of contaminated and uncontaminated soil 14 is excavated from the side of contaminated soil site 6 which is opposite to the impervious layer 12. This quantity of soil 14 is then placed on top of the balance of the contaminated soil site 6 (including impervious layer 12). The original location of the contaminated portion of excavated soil 14 is shown in dashed lines in FIG. 2. In some cases it may be desirable to start the lake in an uncontaminated location, in which case the lake 16 would be located further to the left in FIG. 2.

The excavation of soil 14 is carried out such that it completely removes the furthest lateral extent of the contaminated soil at the side of the contaminated soil site 6 which is opposite to the impervious layer 12. The removal of soil 14 causes ground water to flow into the excavated area to form lake 16 having a water surface 16a substantially at the level of water table 4. When a sufficient amount of soil 14 has been excavated so that the lake 16 is of the desired size, the soil 14 that has been excavated and placed atop contaminated soil 6 will be graded so that rainfall will be directed towards the lake 16. After grading, the soil 14 is capped with a suitable layer 18 of water impervious material such as Bentonite. This capping layer 18 will protect the soil 14 from rainfall permeation. If desired, impervious layer 12 may be similarly formed of Bentonite.

It is to be noted that the length of the lake 16 will be at least as long as the contaminated soil site 6 and the width would be dependent upon the depth to which the lake 16 must reach. The depth of the lake 16 is required to be at least equal to the maximum depth of the contamination at site 6. As the lake 16 is moved across a contaminated area, the depth of the lake could be changed by manipulation of suitable earth moving equipment such as, for example, a dragline. Operation of such equipment with particular regard to the present invention is described in greater detail herebelow. When the lake 16 is of the desired size then a composition for reducing the valence of a high valence metal is added to it. Such a composition may be selected from a saccharide, a disaccharide, a polysaccharide, $FeSO_4$, $N_2SO_2$, $SO_2$, $Na_2S$, $Na_2S_2O_5$. Such a composition would preferably be used in the body of water in a molar concentration of from 1.0 to 100.0 times the molar concentration of the radical or compound containing the metal being reduced in valence although even greater amounts may be used if, for example, a polysaccharide is introduced in materials such as wood chips or sawdust.

Figure 6:
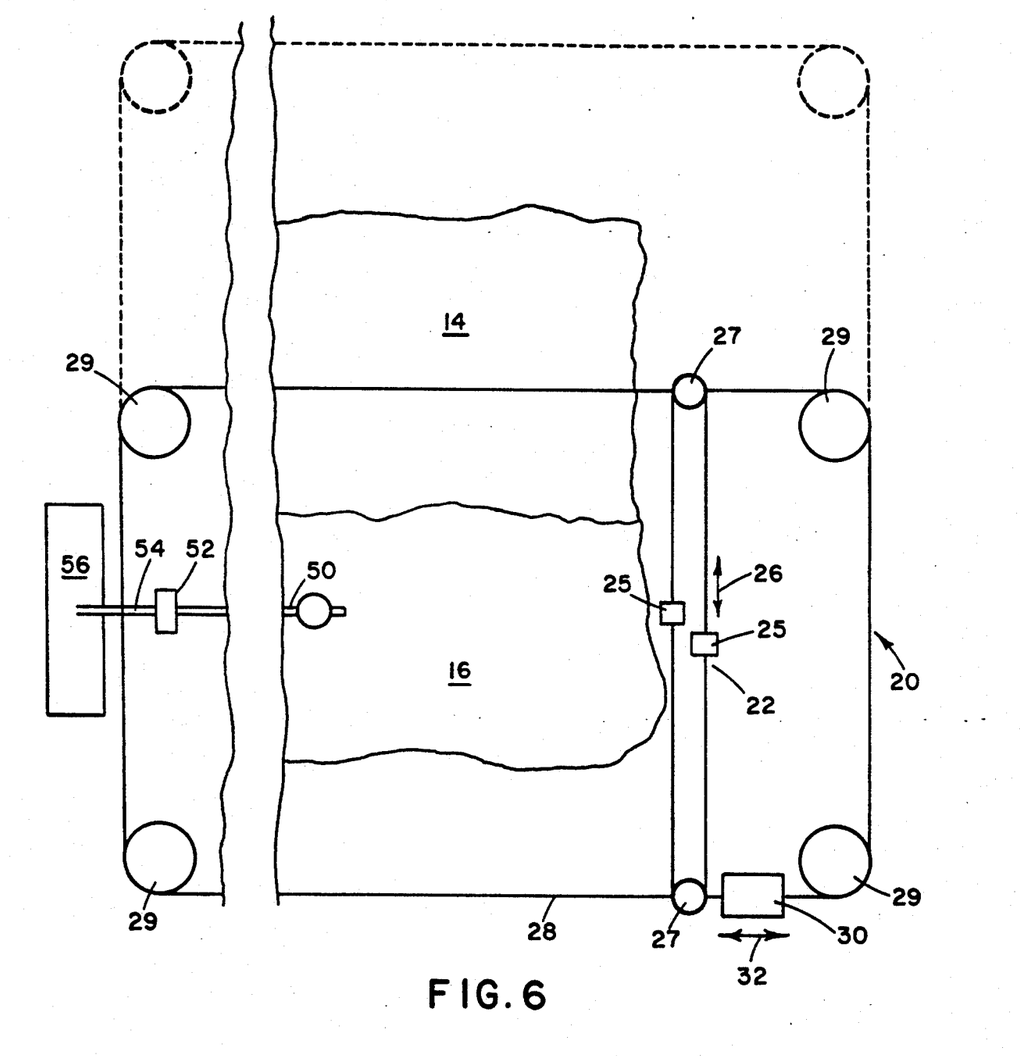
FIG. 6 is a plan view of a further decontamination system usable with a contaminant treatment lake and an earthmoving apparatus which may be used to drag material from the contaminated shore of the treatment lake, then through the lake, and then to the clean side of the lake.

The newly formed lake 16 is provided with an earthmoving equipment system 20 such as, for example, at least one dragline 22 which can be seen in FIG. 6. The earthmoving equipment system 20 illustrated in FIG. 6 is merely illustrative of an earthmoving equipment system which will satisfactory perform the objectives of the present invention. However, it is contemplated that any suitable underwater dragging and/or tilling equipment may be used in the place of the earthmoving equipment of FIG. 6.

As can be seen in FIG. 6, each dragline 22 includes a dragline cable 24 having plurality of interchangeable tools 25 supported thereon. Tools 25 may include scraper buckets for dragging or raking soil 14 down into the bottom of the lake or for dragging treated soil up from the bottom of the lake 16 to form a shoreline of cleaned soil. Tools 25 may then be changed to include harrows or discs when it is required to till the soil 14a located at the bottom of the lake 16 such that the soil 14a becomes fully biologically treated by the microorganisms in the lake.

The dragline cable 24 is reversibly movable by a driving means (not shown) in the directions indicated by arrow 26 in FIG. 6. Forming the dragline cable 24 into a loop are a pair of spaced pulley means 27 such as, for example, block-and tackle devices. One pulley means 27 is secured to, and is translated with, a cable 28 which is passed around a plurality of pulleys 29. Opposite ends of cable 28 are secured to a traction means 30 such as a truck, locomotive, tractor or the like, so as to be translatable in the directions indicated by arrow 32. Translation of the at least one dragline 22 in the directions of arrow 32 permits the full length of the contaminated soil 14 to be raked into, treated in, and dragged from lake 16.

It should now be appreciated that the tools 25 of the at least one dragline 22 are used to rake a first portion of contaminated soil into lake 14 and then till the contaminated soil 14 in the lake. The tools 25 then rake or drag the treated soil from the bottom of the lake up onto the opposite shoreline of lake 16. When this earthmoving sequence is completed, then the entire earthmoving equipment system 20 is moved forwardly (as indicated in dashed lines in FIG. 6) into the direction of the pile of soil 14 and the sequence is repeated. The earthmoving is completed when all of the soil 14 and the underlying contaminated soil from site 6 is decontaminated by the movement of lake 16 therethrough. A sequential cross-sectional view of this operation is seen in FIGS. 2-5 with earthmoving equipment system 20 omitted for purposes of clarity.

Figure 3:
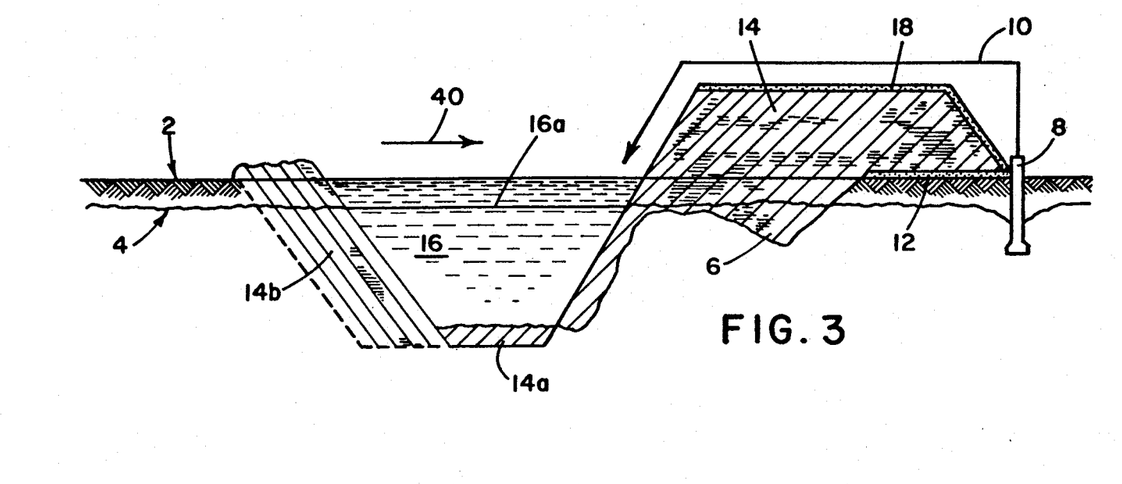

Referring specifically to FIG. 3, it can be seen that several of the aforementioned earthmoving sequences have been completed. That is to say, several times a portion 14a of soil 14 has been dragged down into the bottom of lake 16, then tilled for complete purification treatment thereof, and then dragged up onto the opposite side of lake 16 to form a mass of cleaned shoreline material 14b. Various valence reducing compositions can be added to the lake to effect decontaminations. If decontamination in a chemical reaction can give satisfactory remediation, then these corrective compositions can be added to the lake. Examples of such correcting compositions are saccharides, disaccharides, polysaccharides $Na_2SO_3$, $SO_2$, $Na_2S$ and $Na_2S_2O_5$. The polysaccharides may, for example, be added as wood chips or sawdust. It may also be desirable to acidify the body of water to a pH of from 2.9 to 6.5 in order to satisfactorily cause detoxification of the contaminating high valence metal. Acidifying organic acids could include acetic, and ascorbic acids as well as the standard strong inorganic acids such as $H_2SO_4$ or HCl. The reason for these organic acids is that they will naturally be removed from the site with time, and such removal will be without additional toxic effects. The addition of $SO_2$ as described above would be considered to have added an acidifying agent, since $SO_2$ will be acidic when dissolved in water. Under some conditions basic metallic compounds might arise. An example would be the formation of soluble basic chromic salt ($Cr(OH)SO_4$) when hexavalent chrome is reduced with $SO_2$. The basic chromic salt can be rendered insoluble if brought into contact with protein, due to the formation of an insoluble complex between the chromic salt and the protein. Exposure to light may hasten the reaction between the basic chromic salt and protein.

The reduction of some high valence salts might be slow, and require several weeks to completely removed the high valence materials. Such time will not be of great importance if the proper amount of reducing materials (saccharides, reducing agents or others) are present and are incorporated into the lake water and soils as they are exposed during the movement of the moving lake. If a soluble high valence metal were present in the water and in the treated soil, and a saccharide or other reducing chemical also present in the water and soil, then if the toxic metal were to physically move through the soil, the correcting chemicals would also move with the metal and react with it as it moves.

In accordance with the method of the present invention a small initial quantity of rapidly-reproducing, contaminant-consuming micro-organisms could also preferably be introduced into the lake 16 in the manner disclosed in U.S. Pat. No. 4,948,297 for the purpose of reducing contamination by organic materials. Using a biologically active lake can also reduce the amount of contaminating metals substantially, especially if additional plant-type life is introduced, such as watercress, algae and the like. The pH of the lake containing such microorganisms would be 2.9 to 8.5.

As a series of earthmoving sequences progresses, the lake 16 is caused to move through the contaminated soil site in the direction of arrow 40. As necessary, air spargers (not shown) will be placed in the lake t maintain the lake at all times in a well mixed and aerated condition. Still further, nitrogen and phosphate containing nutrients will be periodically added to the water in lake 16 to further enhance biological activity.

Metal contamination can be still further reduced and preferably substantially eliminated, by using the heavy metal decontamination system depicted in FIG. 6. Lake water bearing not previously remedied heavy metals in solution is pumped from lake 16 by pump P along line 50, through filter means 52, and then along line 54 where it passes through a secondary cleaning system, such as a stationary bed 56 of nonliving algal bio-mass immobilized in a silica polymer or a bed of algae, microbial fauna and/or vascular plants which will remove substantially all the heavy metals from the lake water solution. An adsorption, or extraction operation can be performed on a clarified (filtered) stream from a moving lake that does or does not have biological activity. The effluent stream from the adsorption or extraction could be returned to the lake or taken off site. The water would be of suitable purity, since the lake water must always meet standards. The adsorption mentioned above includes not only adsorption such as that which takes place on activated carbon or organic polymers, but is to include the cases where the absorption operation is performed by passing the filtered/clarified water stream over a stationary bed of living matter (either algae, microbial fauna, or vascular plants). The stationary bed can be periodically harvested of living and/or non-living matter for removal of the toxic contaminants which have adhered to it.

The lake movement is governed by the rate at which the radicals or compounds containing higher valance state metals can be detoxified and/or made insoluble in water and at microorganisms are also used, the rate at which biological activity can clean up any organically contaminated soil The lake water has at all times an acceptably low concentration of contaminants, both organic and heavy metal.

Figure 4:
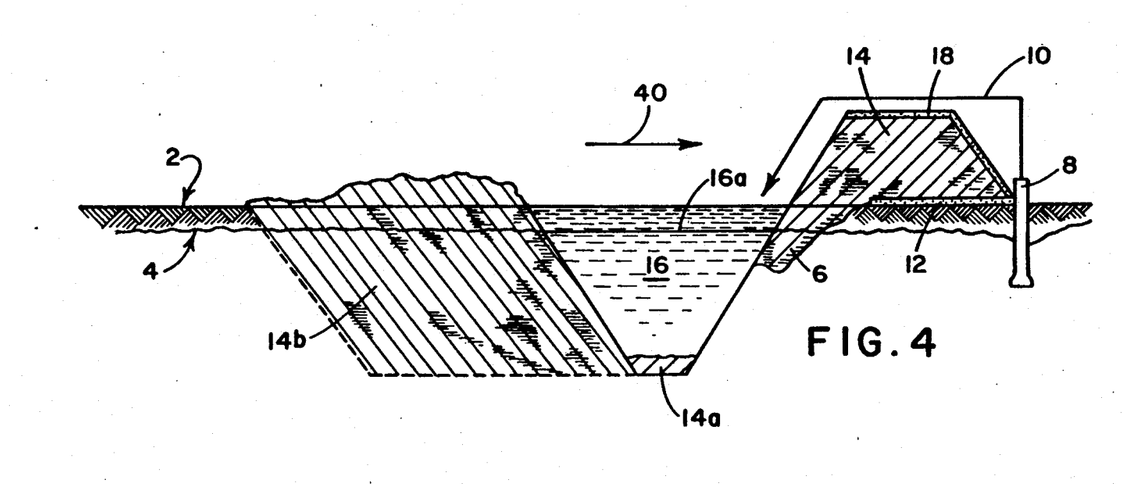

As can be seen in FIG. 4 the lake 16 has moved a significant distance across the contaminated soil site. As the amount of contaminated soil 14 above-ground gets smaller, the volume of the lake 16 also gets smaller.

Figure 5:
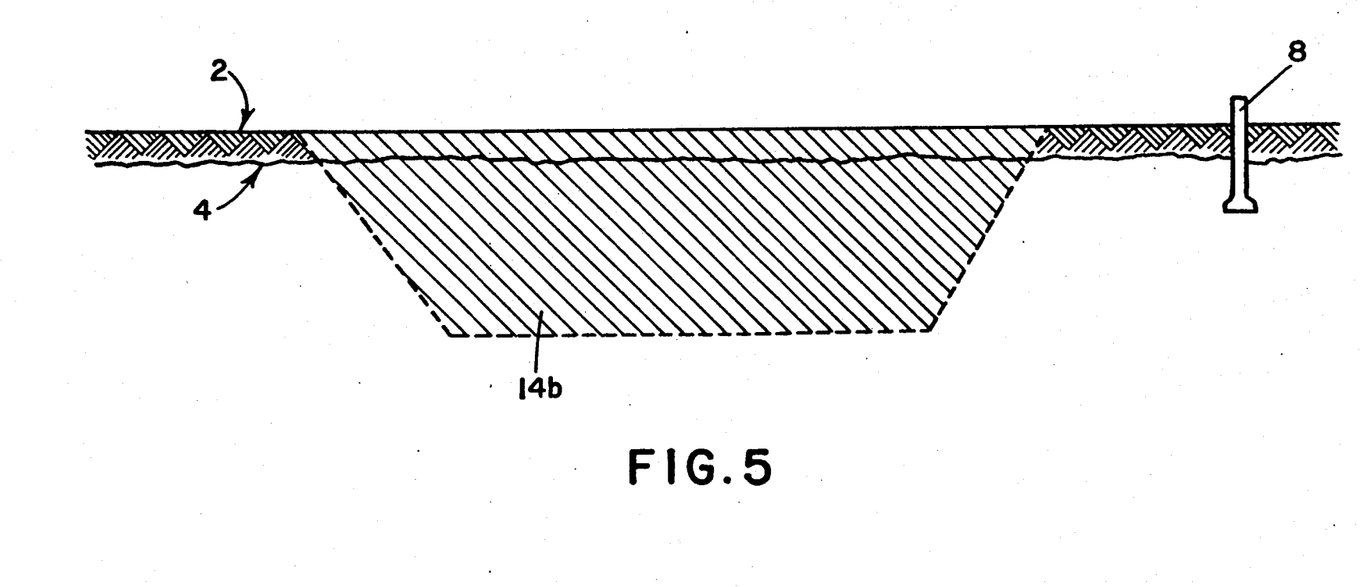

FIG. 5 illustrates the condition in which the lake has progressed completely across the contaminated soil site 6 and has been filled in by the treated soil 14b. In this final condition, the valence reducing compositions contained in the lake 16 have decontaminated the above-ground soil 14, the underlying soil of contaminated soil site 6, and any contaminants remaining in the treatment water. After suitable leveling by tractors or the like, is a fully treated and cleaned soil site where there once was contaminated soil. Containment wells 8, if used, will accordingly be plugged upon completion of the decontamination process.

The "moving lake" method of the present invention performs all decontamination on-site. Moreover, the method completely avoids the separate logistical problems and costs associated with hauling large volumes of contaminated soil, large volumes of contaminated water and large volumes of decontaminated soil. It will also be appreciated that the method of the present invention avoids the difficult problems often associated with the excavation and containment of contaminants in areas having high water tables.

Still further, it should be understood that it is not always necessary to form a lake at one side of a contaminated soil site if one already exists. The step of first forming a lake was described hereinabove, however, since it is in accordance with the fullest and preferred embodiment of the invention.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

What is claimed is:

1. A method for decontaminating soil contaminated with toxic radicals or compounds containing a higher valence state metal, said method comprising the steps of:
   a) introducing a non-biological composition for treating toxic radicals or reducing the valence of the higher valence metal into a body of water which is adjacent to a contaminated soil site;
   b) moving a portion of contaminated soil located along a first side of said body of water into said body of water;
   c) permitting said composition for reducing the valence of high valence metals to reduce the valence of said higher valence metal in said portion of contaminated soil in order to form a portion of decontaminated soil;

d) moving said portion of decontaminated soil to a second side of said body of water to form shore material of decontaminated soil at said second side; and e) repeating steps (b) through (d) until substantially all portions of contaminated soil are decontaminated by said composition for reducing the valence of higher valence metals.

2. The method of claim 1 wherein the reduction of the valance state of the higher valence state metal results in the radical or compound containing such metal being less toxic.

3. The method of claim 2 wherein the said reduction of the valence state of the higher valence metal also results in the radical or compound containing such metal being essentially insoluble in water.

4. The method of claim 1 wherein the reduction of the valence state of the higher valence metal results in the radical or compound containing such metal being essentially insoluble in water.

5. The method of claim 1 further comprising filling in the volume of said body of water with a final portion of said contaminated soil which is moved into said body of water decontaminated by the composition for reducing the valence of high valence metal contained therein.

6. The method of claim 1 further comprising, prior to step (a), the step of forming said body of water by excavating soil from along a side of a contaminated soil site for at least the full length thereof to form an excavated area and filling said excavated area with water to a predetermined level.

7. The method of claim 6 wherein said step of forming said body of water further comprises excavating said soil to a depth at least as great as the greatest depth of contamination within the contaminated soil site.

8. The method of claim 6 further comprising, prior to step (a), placing soil excavated from said excavated area atop said contaminated soil at the first side of said body of water whereby the excavated soil then forms a part of said contaminated soil.

9. The method of claim 1 wherein step (c) further comprises tilling the contaminated soil moved into said body of water to fully expose the contaminated soil for complete treatment thereof by the composition for reducing the valence of higher valence metals.

10. The method of claim 1 wherein in step (a) the composition for reducing valence of high valence metals is selected from the group consisting of saccharides, disaccharides, polysaccharides, $FeSO_4$, $Na_2SO_3$, $SO_2$, $Na_2S$ and $Na_2S_2O_5$.

11. The method of claim 1 wherein saccharides or disaccharides are introduced by adding to the body of water a material selected from wood chips, saw dust, corn syrup and cane sugar.

12. The method of claim 1 wherein the body of water is acidified in step (a).

13. The method of claim 12 wherein the body of water is acidified by adding an organic acid selected from the group consisting acetic acid and ascorbic acid.

14. The method of claim 12 wherein the body of water is acidified by adding an inorganic acid selected from the group consisting of sulfuric acid and hydrochloric acid.

15. The method of claim 12 wherein the body of water is acidified to a pH of from about 2.9 to about 6.5.

16. The method of claim 1 wherein in step (a) a protein is added to the body of water.

17. The method of claim 1 wherein said higher valence metals are selected from the group consisting of $Cr^{+6}$, $As^{+6}$, $Sn^{+4}$, $Hg^{+2}$, and $Cu^{+2}$.

18. The method of claim 1 wherein in step (a) a biological contaminant-consuming microorganism is also introduced into the body of water and in step (c) said microorganisms are also permitted to help decontaminate the portion of contaminated soil moved in step (b) and in step (e) steps (b) through (d) are repeated until substantially all portions of contaminated soil are treated by said microorganisms.

19. The method of claim 18 wherein the body of water is contacted with additional types of plant life.

20. The method of claim 18 wherein the pH of the body of water is from about 2.9 to about 8.5.

21. The method of claim 1 wherein the composition reducing the valence of high valence metals is in a concentration in the body of water of at least 1.0 times the molar concentration of the radical or compound containing higher valence state metal.

22. The method of claim 1 wherein a stream of water from the body of water is removed from the lake for removal of further contaminants.

23. The method of claim 22 wherein the stream is returned to the body of water after the removal of further contaminants.

24. A method for decontaminating soil contaminated with toxic radicals or compounds containing a higher valence metal, said method comprising the steps of:

a) forming a body of water by excavating soil from along a side of a body of contaminated soil for at least the full length thereof to form an excavated area and then filling said excavated area with water to a predetermined level;

b) placing soil excavated from said excavated area atop said body of contaminated soil whereby the excavated soil then forms a part of said body of contaminated soil said body of contaminated soil thus being positioned along a first side of said body of water;

c) introducing a non-biological composition for treating the toxic radicals or reducing the valence of the higher valence metal into said body of water;

d) moving a portion of said body of contaminated soil positioned along said first side of said body of water into said body of water;

e) permitting said composition for reducing the valence of high valence metal to decontaminate said portion of said body of contaminated soil in order to form a portion of decontaminated soil;

f) moving said portion of decontaminated soil to a second side of said body of water to form shore material of decontaminated soil at said second side;

g) repeating steps (d) through (f) until substantially all portions of said body of contaminated soil are decontaminated by said composition for reducing the valence of high valence metals; and h) filling in the volume of said body of water with a final portion of said body of contaminated soil which is moved into said body of water and decontaminated by the said composition contained therein.

25. The method of claim 24 wherein the reduction of the valance state of the higher valence state metal results in the radical or compound containing such metal being less toxic.

26. The method of claim 25 wherein the reduction of the valence state of the higher valence metal also results in the radical or compound containing such metal being essentially insoluble in water.

27. The method of claim 24 wherein the reduction of the valence state of the higher valence metal results in the radical or compound containing such metal being essentially insoluble in water.

28. The method of claim 24 wherein step (e) further comprises tilling the contaminated soil moved into said lake to fully expose the contaminated soil for complete treatment thereof.

29. The method of claim 24 wherein in step (c) the composition for reducing valence of high valence metals is selected from the group consisting of saccharides, disaccharides, polysaccharides, $FeSO_4$, $Na_2SO_3$, $SO_2$, $Na_2S$ and $Na_2S_2O_5$.

30. The method of claim 24 wherein saccharides, disaccharides or polysaccharides are introduced by adding to the body of water a material selected from the group consisting of wood chips, saw dust, corn syrup and cane sugar.

31. The method of claim 24 wherein the body of water is acidified in step (c).

32. The method of claim 31 wherein the body of water is acidified by adding an organic acid selected from the group consisting of acetic acid and ascorbic acid.

33. The method of claim 31 wherein the body of water is acidified by adding an inorganic acid selected from the group consisting of sulfuric acid and hydrochloric acid.

34. The method of claim 31 wherein the body of water is acidified to a pH of from about 2.9 to about 6.5.

35. The method of claim 24 wherein in step (c) a protein is added to the body of water.

36. The method of claim 24 wherein the higher valence metals are selected from the group consisting of $Cr^{+6}$, $As^{+6}$, $Sn^{+4}$, $Hg^{+2}$, and $Cu^{+2}$.

37. The method of claim 36 wherein the body of water is contacted with additional types of plant life.

38. The method of claim 24 wherein in step (c) a biological contaminant-consuming microorganism is also introduced into the body of water and in step (e) said microorganisms are also permitted to help decontaminate the portion of contaminated moved in step (d) and in step (g) steps (d) through (f) are repeated until substantially all portions of contaminated soil are treated by said microorganisms.

39. The method of claim 24 wherein in step (c) a biological contaminant-consuming microorganism is also introduced into the body of water and in step (e) said microorganisms are also permitted to help decontaminate the portion of contaminated soil moved in step (d) and in step (e) steps (f) through (h) are repeated until substantially all portions of contaminated soil are treated by said microorganisms.

40. The method of claim 24 wherein the composition for reducing the valence of higher valence metals is at least 1.0 times the molar radical or compound containing the higher valence state metal.

41. The method of claim 24 wherein a stream of water from the body of water is removed from the lake for removal of further contaminants.

42. The method of claim 41 wherein the stream is returned to the body of water after the removal of further contaminants.

* * * * *